Figure 1:
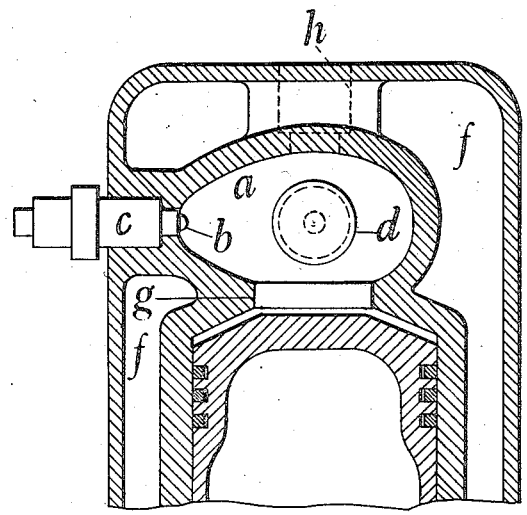

K. I. CROSSLEY AND W. LE P. WEBB.
INTERNAL COMBUSTION ENGINE.
APPLICATION FILED JULY 27, 1920.

1,423,087.

Patented July 18, 1922.

Inventors
K. I. Crossley
W. L. P. Webb
By H. R. Kerlake
Attorney

UNITED STATES PATENT OFFICE.

KENNETH IRWIN CROSSLEY AND WILFRED LE PLASTRIER WEBB, OF MANCHESTER, ENGLAND.

INTERNAL-COMBUSTION ENGINE.

1,423,087.         Specification of Letters Patent.      Patented July 18, 1922.

Application filed July 27, 1920. Serial No. 399,393.

(GRANTED UNDER THE PROVISIONS OF THE ACT OF MARCH 3, 1921, 41 STAT. L., 1313.)

*To all whom it may concern:*

Be it known that we, KENNETH IRWIN CROSSLEY and WILFRED LE PLASTRIER WEBB, subjects of the King of Great Britain and Ireland, and residents of Openshaw, Manchester, in the county of Lancaster, England, have invented certain new and useful Improvements Relating to Internal-Combustion Engines, for which we obtained a patent in Great Britain, No. 2,976, dated September 14th, 1915, and of which the following is a specification.

Our invention relates to improvements in combustion chambers of internal combustion oil engines working on the four stroke cycle and its object is to improve the mixing of the oil fuel with the air, to improve the combustion and to improve the thermal efficiency of the engine.

The kind of engine to which our invention relates is that in which the oil fuel is injected (without the aid of separate injection air) into the compressed and therefore heated air in the combustion chamber at or near the end of the compression stroke.

We arrange the combustion chamber with the air admission valve and the exhaust valve on two of its sides and in some cases we arrange an air starter valve on a third side or on the end of the combustion chamber.

The combustion chamber is constructed in such a manner as to be approximately oviform in shape or as near thereto as the natural limitations of design will permit. The oil injector nozzle is located in the smaller end of the combustion chamber. The opening from the combustion chamber into the cylinder is arranged in any desired place on one side of the combustion chamber.

The combustion chamber is water jacketed wherever conveniently possible.

By constructing the combustion chamber in the manner described the oil spray or vapour issuing from the oil injector thoroughly permeates the hot compressed air in the combustion chamber and the combustion is improved. The thermal efficiency of the engine is also improved.

If desired the end of the piston may be reduced in size and this reduced portion arranged to enter the opening between the cylinder and the combustion chamber at the ends of the compression and exhaust strokes.

If the heat due to the compression of the air is not sufficient to effect ignition an ignition device such as an ignition tube or bulb an electric sparking plug or catalytic means may be arranged in any convenient position in the combustion chamber. If the heat of compression is sufficient for ignition no separate ignition device is used or is necessary unless specially desired as an alternative.

We are aware that it has previously been proposed to employ a pear-shaped combustion chamber with an oil injector nozzle at the small end and with coaxial admission and exhaust valves on two of its sides and an opening into the cylinder on a third side but in such case the larger end of the combustion chamber has not been water jacketed but has formed and been used as a large hot surface igniter.

Figure 2:
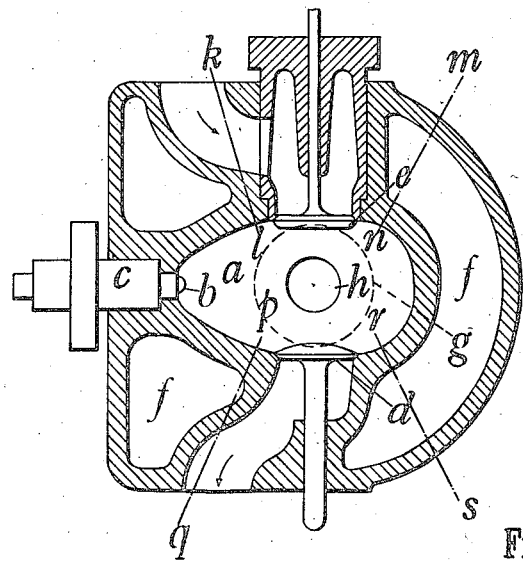
Figure 3:
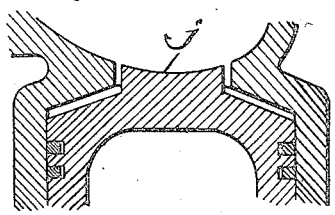

Referring to the drawings in which Figure 1 illustrates in sectional plan and Figure 2 in cross section one method of carrying out our invention the oviform combustion chamber is shown at A, the oil injector nozzle at B, oil injector at C, exhaust valve at D, air admission valve at E, water jacket at F. F. opening from combustion chamber into cylinder G, ignition device (if one is used) being placed in the aperture shown for example in dotted lines at H, and the reduced end of piston (if this is desired) being shown at Figure 3.

Instead of the air admission valve and exhaust valve being placed as shown on opposite sides of the combustion chamber and co-axial with each other they may be placed at any other convenient positions on any two sides of the combustion chamber. As examples the admission valve could be arranged with its axis placed on either of the lines K L, or M N and the exhaust valve with its axis arranged on either of the lines P Q or R S. Similarly the air admission valve and exhaust valve may be placed in such positions on any two sides of the combustion chamber that their axial lines lie at any desired angle with each other and either in one plane or not as may be desired.

The combustion chamber is water-jacketed wherever conveniently possible as shown for instance at F F in the drawing.

Having now described our invention what we claim is:—

1. In internal combustion oil engines, the combination comprising a cylinder, an oviform combustion chamber, a water jacket contacting with the larger end of the said chamber, an oil injector nozzle at the smaller end of the chamber, an air admission valve on one side, an exhaust valve on a second side and an opening to the said cylinder on a third side of the chamber, as set forth.

2. In internal combustion oil engines, the combination comprising a cylinder, an oviform combustion chamber, a water jacket contacting with the larger end of the said chamber, an oil injector nozzle at the smaller end of the chamber, an air admission valve, an exhaust valve, an opening to the said cylinder, and an ignition device respectively on the four sides of the chamber, as set forth.

3. In internal combustion engines, the combination comprising a cylinder, an oviform combustion chamber, a water jacket contacting with the larger end of said chamber, an oil injector nozzle at the smaller end of the chamber, an air admission valve on one side, an exhaust valve on a second side and an opening to the said cylinder on a third side of the chamber, and a piston having a reduced end which enters the said opening, as set forth.

In testimony whereof we have signed our names to this specification.

KENNETH IRWIN CROSSLEY.
WILFRED LE PLASTRIER WEBB.